F. M. DUPONT AND G. A. HANKE.
PROCESS FOR MAKING CALCIUM OXALATE.
APPLICATION FILED MAR. 18, 1919.
1,349,947.  Patented Aug. 17, 1920.
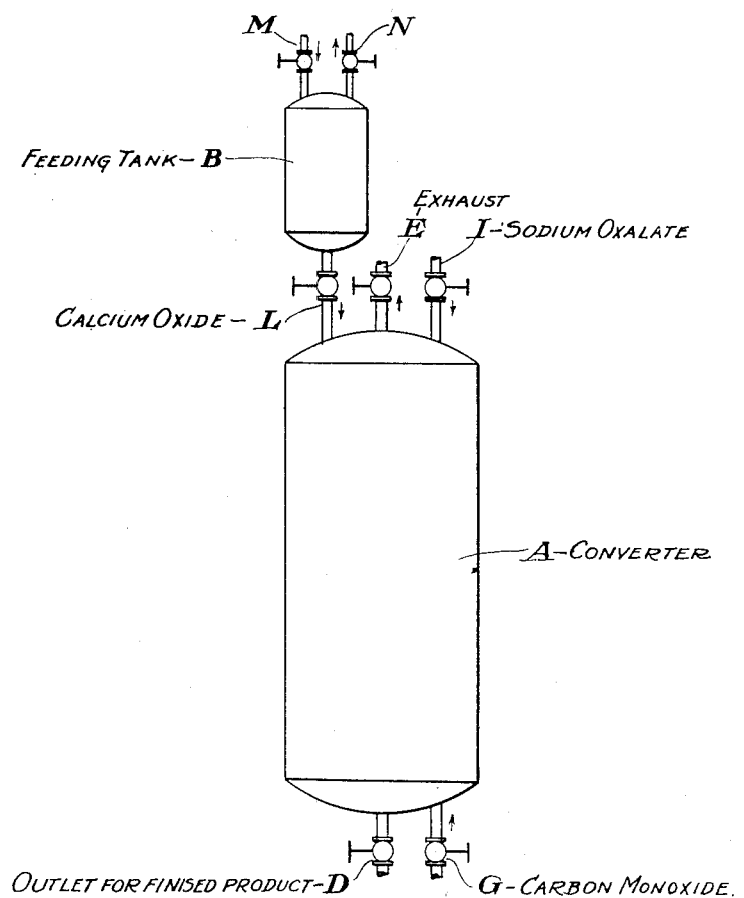

UNITED STATES PATENT OFFICE.

FRANCIS M. DUPONT AND GUSTAV A. HANKE, OF MILWAUKEE, WISCONSIN.

PROCESS FOR MAKING CALCIUM OXALATE.

1,349,947.  Specification of Letters Patent.  Patented Aug. 17, 1920.

Application filed March 18, 1919. Serial No. 283,397.

*To all whom it may concern:*

Be it known that we, FRANCIS M. DUPONT, a citizen of the United States, and resident of Milwaukee, in the county of Milwaukee and State of Wisconsin, and GUSTAV A. HANKE, a subject of Austria, and resident of Milwaukee, in the county of Milwaukee and State of Wisconsin, have invented new and useful Improvements in Processes for Making Calcium Oxalate, of which the following is a description, reference being had to the accompanying drawings, which are a part of this specification.

The invention relates to a process for the manufacture of calcium oxalate and sodium formate.

Heretofore calcium oxalate has been made by the process of transformation of the water soluble compound of sodium oxalate into the water insoluble compound of calcium oxalate and sodium hydroxid by the use of hydrated lime, as expressed in the following formula:

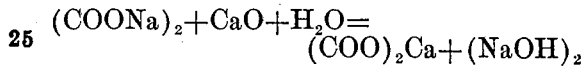

The above reaction, however, reaches its point of equilibrium as soon as the liberated sodium hydroxid attains a concentration of about four per cent., depending slightly on physical conditions such as temperature and pressure, but never exceeding four and one-half per cent. sodium hydroxid in solution. This makes it necessary to work with very dilute solutions. It is well established also that a change in the physical conditions, such as temperature and pressure, or by the increasing of the quantities of the reacting components only slightly affect the point of equilibrium. It requires, therefore, a hundred parts of water to decompose six parts of sodium hydroxid into calcium oxalate under this process and this results in a high operating cost to reclaim the sodium hydroxid from this very dilute solution.

Heretofore sodium formate has been produced by the action of carbon monoxid on sodium hydroxid in solution or in solid state at high temperatures and pressures according to the formula

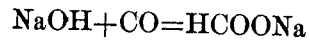

The object of our invention is to provide a process in which calcium oxalate and sodium formate may each be obtained in a simple and expeditious manner and particularly to produce these compounds without the formation of sodium hydroxid, the objectionable factor in the two prior processes just described, with the resulting decrease in operating cost of the process and in the cost of installation and upkeep of the apparatus for carrying out the process.

As stated above, if the sodium hydroxid formed in solution by the action of calcium hydroxid on sodium oxalate in the presence of water reaches its equilibrium around four to four and one-half per cent., no more sodium oxalate can be transformed into calcium oxalate in the same solution, and consequently the elimination of the sodium hydroxid is important as by its elimination it is possible to change all the sodium oxalate introduced into calcium oxalate by a continuous process in the same solution.

In our process we carry on the transformation of sodium oxalate into calcium oxalate by means of calcium oxid (milk of lime) in the presence of carbon monoxid (producer gas) and by this process we not only eliminate the limiting factors of the first prior process above referred to but form at the same time the very valuable compound of sodium formate. Furthermore, in eliminating or preventing the formation of sodium hydroxid we also eliminate the well known detrimental action of sodium hydroxid on concentrated solutions of sodium formate. In this way we are able to transform large quantities of sodium oxalate with comparatively little water into calcium oxalate and a strong solution of sodium formate, which can be transformed by any of the well known methods into sodium oxalate, which may be again used in the process for obtaining further amounts of calcium oxalate. The formation of the calcium oxalate and the sodium formate by our process may be expressed by the following formula:

$$(COONa)_2 + CaO + H_2O + 2CO = (COO)_2CA + (HCOONa)_2$$

This new process results in the following advantages: First, saving of a separate converter and its auxiliary machinery, such as evaporators, settling tank, pumps, etc., second, complete elimination of the apparatus for the recuperating of the sodium hydroxid with the resulting enormous saving on fuel necessary to concentrate very dilute liquids of sodium hydroxid, third, the production of calcium oxalate of a higher degree of purity and a sodium formate of a higher concentration, also resulting in a saving of fuel, and, lastly, shortening of the time of reaction to carry out the process.

The accompanying drawing shows diagrammatically one form of apparatus that may be employed to perform our process.

In the drawing, A is a converter, I the inlet for the liquid (sodium oxalate), E the exhaust for gases from the converter, G the inlet for carbon monoxid (producer gas), D the outlet for drawing off the finished product, L the inlet for calcium oxid (milk of lime), all of said ports connecting with the converter being controlled by suitable valves as shown. The calcium oxid is fed to the inlet pipe L from a feeding tank B provided with a valve controlled inlet M and a valve controlled exhaust N.

In operation the converter is charged with sodium oxalate in solution in water and in suspension, and this mixture is heated. We have used a temperature of about 375° Fahrenheit but this may be varied depending upon the concentration. Then carbon monoxid, or commercial carbon monoxid (producer gas), preferably free of carbon dioxid, is continuously pumped into the bottom of the converter and into the mixture therein to insure a thorough stirring up of the suspended matter and its intimate contact with the carbon monoxid. We have used a pressure of approximately 275 pounds per square inch within the converter at all times but other pressures may be used. Milk of lime in adequate concentration is allowed to flow gradually and continuously into the converter by means of either a feeding tank or a pump in such a manner that the carbon monoxid is always present in a slight excess. The action of the lime and carbon monoxid is such that as fast as the sodium oxalate splits up the lime takes the acid radical of the sodium oxalate and the carbon monoxid takes the base radical of the same, the excess of carbon monoxid being used to absolutely prevent any formation of free sodium hydroxid. The surplus and spent gases, such as nitrogen and small amounts of carbon monoxid, within the converter are allowed to pass out through the exhaust outlet in such a manner as to maintain the desired pressure. At the rate sodium oxalate is decomposed into calcium oxalate and sodium formate, sodium oxalate in suspension will go into solution until all sodium oxalate is decomposed. The addition of lime is interrupted when all sodium oxalate has been completely transformed into calcium oxalate. The resulting product then contains calcium oxalate in suspension in a solution of sodium formate, so that the calcium oxalate may be readily removed from the product. Quantity and concentration of the calcium oxalate depends only on the original quantity of sodium oxalate introduced.

It will be noted that the present process therefore results in the production of an amount of calcium oxalate corresponding to the amount of sodium oxalate used in the reaction and also in the production of sodium formate in solution, which constituents of the product may be readily separated from each other so that the sidium formate may be transformed by well known methods into sodium oxalate, which by a repetition of the process results in the formation of more calcium oxalate. By the term "carbon monoxid" as used in the claims it is to be understood that it refers to pure carbon monoxid or to producer gas containing the same.

What we claim as new and desire to secure by Letters Patent is:

1. That step in the process of producing calcium oxalate and sodium formate which consists in subjecting a mixture of sodium oxalate in solution and suspension, milk of lime and carbon monoxid to heat and pressure.

2. The process of producing calcium oxalate and sodium formate which consists in continuously adding carbon monoxid and continuously and gradually adding milk of lime to a mixture of sodium oxalate in solution and suspension and subjecting this mixture of sodium oxalate, milk of lime and carbon monoxid to heat and pressure.

3. The process of producing calcium oxalate from a mixture of sodium oxalate in solution and suspension which consists in adding milk of lime and carbon monoxid to said mixture, while said mixture is under heat and pressure to combine the acid radical of the sodium oxalate with the base radical of the lime and the base radical of the sodium oxalate with the carbon monoxid.

4. The process of producing calcium oxalate from a mixture of sodium oxalate in solution and suspension, which consists in continuously adding milk of lime and carbon monoxid in excess to said mixture to form calcium oxalate and sodium formate while said mixture is subjected to heat and pressure.

5. The process of producing calcium oxalate from a mixture of sodium oxalate in solution and suspension which consists in continuously adding milk of lime and carbon monoxid to said mixture and maintaining the reaction at a temperature of about 375° F. and a pressure of about 275 pounds per square inch.

In testimony whereof we affix our signatures in presence of two witnesses.

FRANCIS M. DUPONT.
GUSTAV A. HANKE.

Witnesses:
R. S. C. CALDWELL,
H. D. CHASE.